Aug. 17, 1954 A. V. BEDFORD 2,686,869

SIGNAL TRANSMISSION SYSTEM

Filed Nov. 27, 1951

5 Sheets-Sheet 1

INVENTOR
Alda V. Bedford
BY
[signature]
ATTORNEY

Aug. 17, 1954

A. V. BEDFORD 2,686,869

SIGNAL TRANSMISSION SYSTEM

Filed Nov. 27, 1951

5 Sheets-Sheet 2

INVENTOR
Alda V. Bedford
BY
[signature]
ATTORNEY

Aug. 17, 1954 A. V. BEDFORD 2,686,869

SIGNAL TRANSMISSION SYSTEM

Filed Nov. 27, 1951 5 Sheets-Sheet 3

INVENTOR
Alda V. Bedford
BY
ATTORNEY

INVENTOR
Alda V. Bedford
BY Edwin (?) Mitchell
ATTORNEY

Aug. 17, 1954

A. V. BEDFORD

SIGNAL TRANSMISSION SYSTEM 2,686,869

Filed Nov. 27, 1951

5 Sheets-Sheet 5

INVENTOR
Alda V. Bedford
BY
ATTORNEY

Patented Aug. 17, 1954

2,686,869

UNITED STATES PATENT OFFICE 2,686,869

SIGNAL TRANSMISSION SYSTEM

Alda V. Bedford, Princeton, N. J., assignor to Radio Corporation of America, a corporation of Delaware Application November 27, 1951, Serial No. 258,368

7 Claims. (Cl. 250—6)

This invention relates to a signal transmission system in which a signal may be conveyed in a transmission channel having a bandwidth that is less than the highest frequency in the transmitted signal.

Quantizing systems have been employed to transmit a plurality of independent signals in channels having less bandwidth than would normally be required if each signal were carried by a separate channel. This may be done by quantizing one of the signals and inserting the others in between quanta levels. Quantizing as used in this specification is defined in the "Bell System Technical Journal" of July 1948, pages 446 and 447, as the process of replacing a signal by a wave constructed of values selected from a discrete set of values available, or as defined in "Proceedings of the IRE" of November 1948, page 1324, last paragraph, quantizing is representing a signal by certain discrete allowed levels only.

The object of the present invention is to provide quantizing methods and apparatus whereby one signal can be transmitted in a channel having less bandwidth than the signal.

This objective may be obtained by treating the values of a signal occurring at uniformly spaced intervals as though they were separate signals. For example, the signal value occurring during a first interval may be quantized and the signal value occurring during a preceding interval may be delayed by an amount of time existing between the two intervals and added in between the quanta levels and the first signal. The composite signal thus formed during the first interval represents the signal values occurring during the first interval as well as the preceding interval.

The manner in which this may be accomplished will be better understood from a detailed consideration of the drawings in which.

Figure 3:
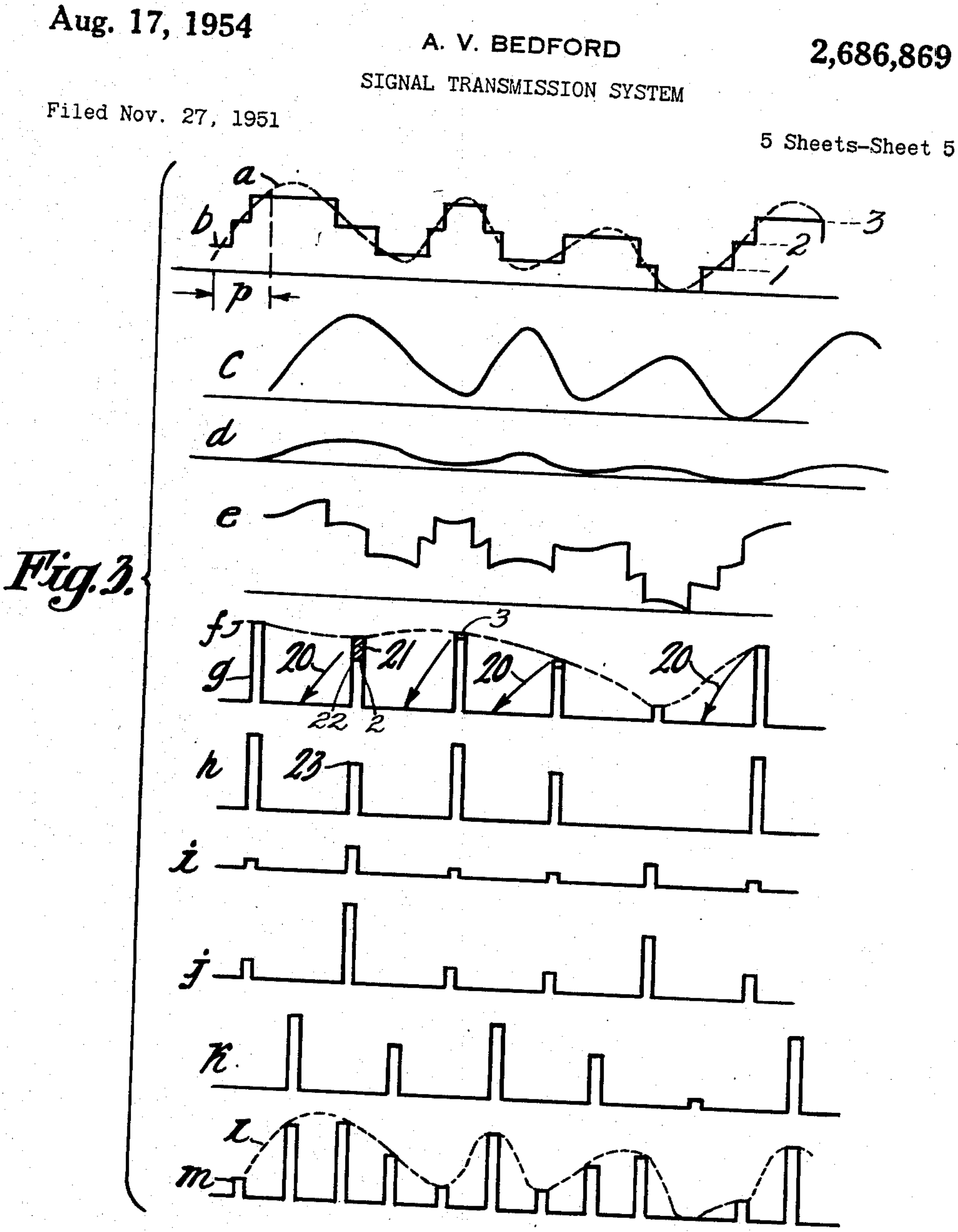
Figure 3 illustrates waves that appear at different points in the transmitter of Figure 1 and the receiver of Figure 2.

In discussing the transmitter of Figure 1 consideration will be given to the waveforms of Figure 3 which bear letters corresponding to similarly designated points in the transmitter of Figure 1 and in the receiver of Figure 2. The wave form *a* appears at the output of a signal source 2 and after passing through a quantizer 4 appears as a stepped wave *b* which is applied to an adder 6. The signal supplied by the source 2 and represented by the wave form *a* is also passed to the adder 6 via a delay circuit 8 and an attenuator 10. The output of the delay circuit 8 is represented by the wave form *c* and the output of the attenuator 10 is indicated by the wave form *d*. In this particular arrangement, the signal *a* is to be transmitted at half the normal band width or in other words, at a band width that is half the highest frequency of the signal *a* itself. In this situation, the delay circuit 8 delays the signals applied to it by a half a cycle of this highest frequency. The attenuator 10 serves to reduce the amplitude of this delayed signal so that it does not exceed any one quanta step present in wave form *b*. The output of attenuator 10 is represented by wave *d*. The output of the adder 6, represented by wave *e*, is sampled by a circuit 12 so as to form a series of composite pulses or samples *g*. A low-pass filter 14 limits the highest frequency that can be applied to a transmitting means 16 to one-half the highest frequency of the signal *a* that is to be transmitted and therefore changes the pulses *g* to form a waveform *f*.

The sampling circuit 12 may be comprised of a normally cut off gating amplifier that is rendered conductive by pulses from a source of sampling signals 18. The frequency of these pulses will be equal to twice the highest frequency passed by the low-pass filter 14. Therefore the frequency of the pulses of information passed on by the sampling circuit 12 is equal to the highest effective frequency of the signal *a* to be transmitted.

In normal types of signal transmission, the number of pulses *g* required to represent faithfully a signal *a* must be equal to twice the highest frequency of the signal *a* and the band width required would be equal to the highest frequency of the signal *a*. In accordance with this modification of the invention, however, each of the composite pulses *g* represents two values of the signal *a* occurring at different times and thus the required band width is cut in half. This would require that the delayed signals be separately sampled. In fact the sampling can be done at most any point as long as the final samples of the signal and its delayed components arrive at the low-pass filter 14 simultaneously. The signal *a* arrives at the adder 6 in quantized form as indicated by the wave form *b* and also in a delayed and attenuated form as indicated by the wave form *d*. The output of the adder is a wave form *e* which is a summation of the waves *b* and *d*. It is this wave form *e* that is sampled in the sampler 12 and, therefore, each pulse *g* emerging from the sampler 12 has an amplitude corresponding to the quantized level of the signal *a* at a particular instant of time plus the attenuated value that the signal *a* had at a previous interval of time. The white portions of the pulses *g* indicate the quantized values of the signal *a* at the instant of time during which the sampling pulse occurs, and due to the delaying action of the delay circuit 8 the shaded portion of the pulses *g* represents the attenuated value of the wave form *a* at a previous time indicated by the arrows 20. The delay is such that this previously indicated time falls midway between the pulses *g*.

Various arrangements of the components are possible. For example, the quantizer 4 might be a cathode ray tube provided with a step shaped target and equipped with an electron gun for projecting a flat broad beam of electrons. The signal to be quantized is applied so as to deflect the beam up and down the step shaped target so that different discrete amounts of the cross sectional area of this beam strike the target. With such a quantizer, the sampling might be accomplished by pulsing the beam on and off.

Figures 1, 2, 4:
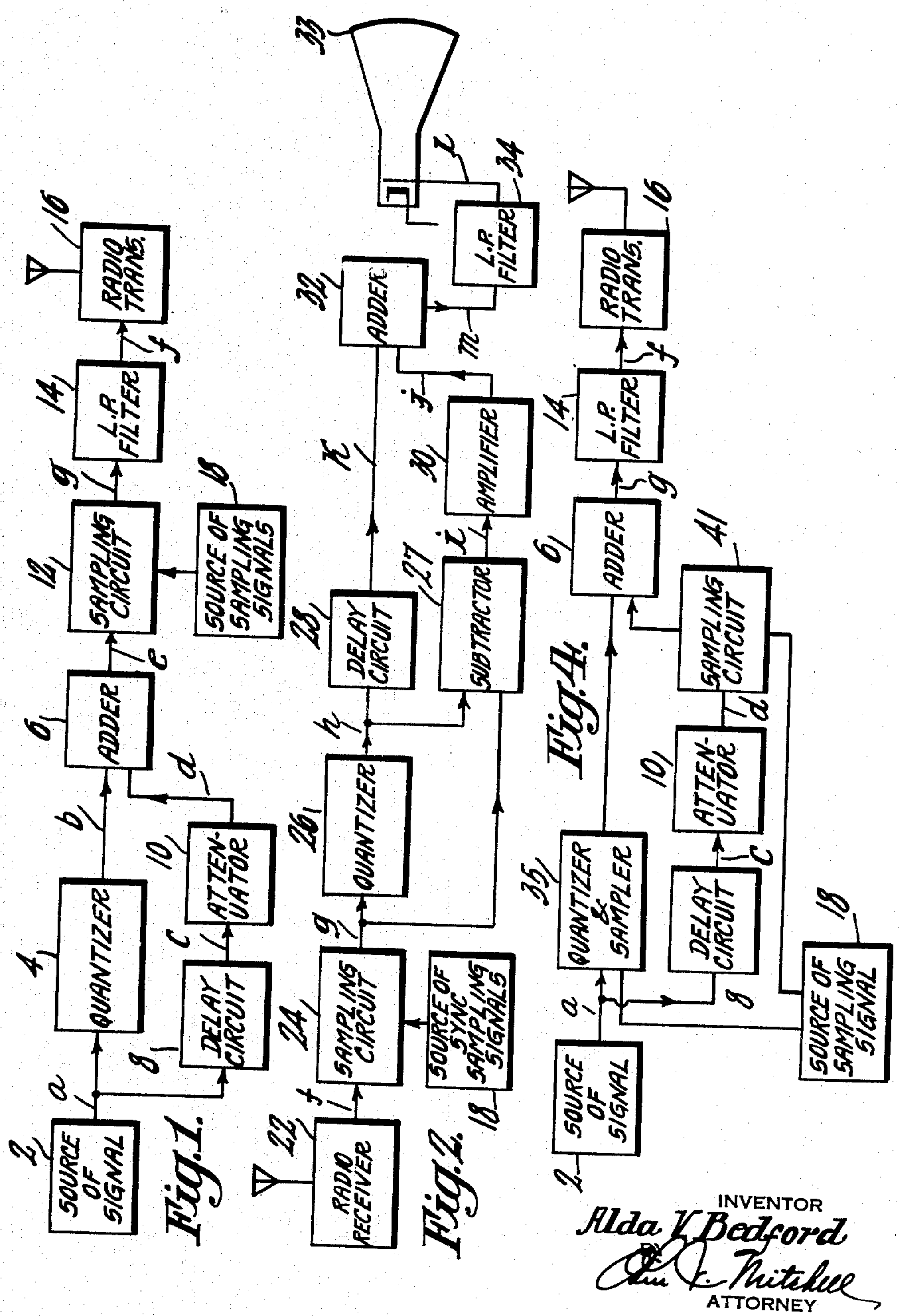
Figure 1 illustrates in block diagram a transmitter in which a signal may be sent with half the normal band width.
Figure 2 illustrates a receiver adapted to detect the signal sent by the transmitter of Figure 1.
Figure 4 shows another form of transmitter.

Figure 2 illustrates a receiver adapted to reconstruct the wave *a* from the wave *f*. The wave *f* is detected by any suitable means 22 and applied to a sampler 24 which is operated in synchronism with the sampler 12 at the transmitter of Figure 1. Because the wave *f* goes through the peaks of the pulses *g* and because this wave *f* is sampled in a sampling circuit 24 at the same relative instants, the pulses *g* are recovered. The pulses *g* are then quantized in a quantizer 26 so as to produce pulses *h* that correspond exactly to the height of the quantized wave *b* at corresponding instants of time. For example, in pulse 22 of the pulses *g*, the darkened portion lies above the quanta level 2, but does not quite come up to the quanta level 3. The pulses *h* are subtracted from the pulses *g* in a subtractor 27 so as to derive pulses *i*. The subtractor may be comprised of two amplifiers having a common load. One amplifier is fed with the output of the quantizer and the other amplifier is fed with signals at the input of the quantizer after they have been inverted in polarity. Such devices are well known to those skilled in the art and for this reason further details are not presented. Actually, the pulses *i* represent the attenuated value of the signal *a* at a point indicated at arrows 20. However, the original phase relationship between the pulses *h* and *i* can be restored if the pulses *h* are delayed by circuit 28 so as to form pulses *k*. The original amplitude of the attenuated pulses *i* can be restored by suitable amplification in an amplifier 30 to form wave *j*.

The pulses *j* and *k* are added in adder 32 to provide the pulses *m*. After integration in the low pass filter 34, the wave *l* is recovered and may be applied to any means such as kinescope 33 that is adapted to make use of the signal. It will be noted that the recovered wave *l* is substantially the same shape as the wave *a*, but that it is delayed by an amount equal to the delay in the delay circuit 8 of the transmitter or the delay of the delay circuit 28 in the receiver.

The sampling can be effected at different points in the circuit than that shown. It is important, however, that the points selected be such that the pulses applied to the adder 32 occur in the correct order. For example, the sampling could be done in the electric path carrying the quantized signal at any point before the delay circuit 28 and in the electrical path bearing the other signals the sampling could be accomplished after the subtractor 27. If, however, the sampler in the electrical path carrying the quantized signal is operated at times occurring between the samples of the sampler in the other path, it can be located after the delay circuit 28.

Figure 4 shows an alternative form of transmitter. Corresponding components in Figures 1 and 4 are indicated by the same numerals. As in Figure 1 there are two electrical signal carrying paths coupled between the source of signal 2 and the output to the transmitter, one of the paths carrying quantized signals and the other carrying signals that are attenuated to fit in between the quanta levels. In both arrangements the common input ends of the two paths may be termed an input terminal and the input to the low pass filter 14 or the transmitter 16 may be considered as an output terminal. Each of the arrangements shows a different way of permitting energy to flow from the input terminal to the output terminal during uniformly spaced intervals. In the arrangement of Figure 4 this is accomplished by sampling the signals after they have been combined in the adder 6. In the arrangement of Figure 4 this is accomplished by sampling in each of the paths. For example, apparatus 33 could be a quantizing cathode ray tube having its beam keyed by the sampling signals. A separate sampler 35 could be employed in the other path.

Figures 5, 6, 7:
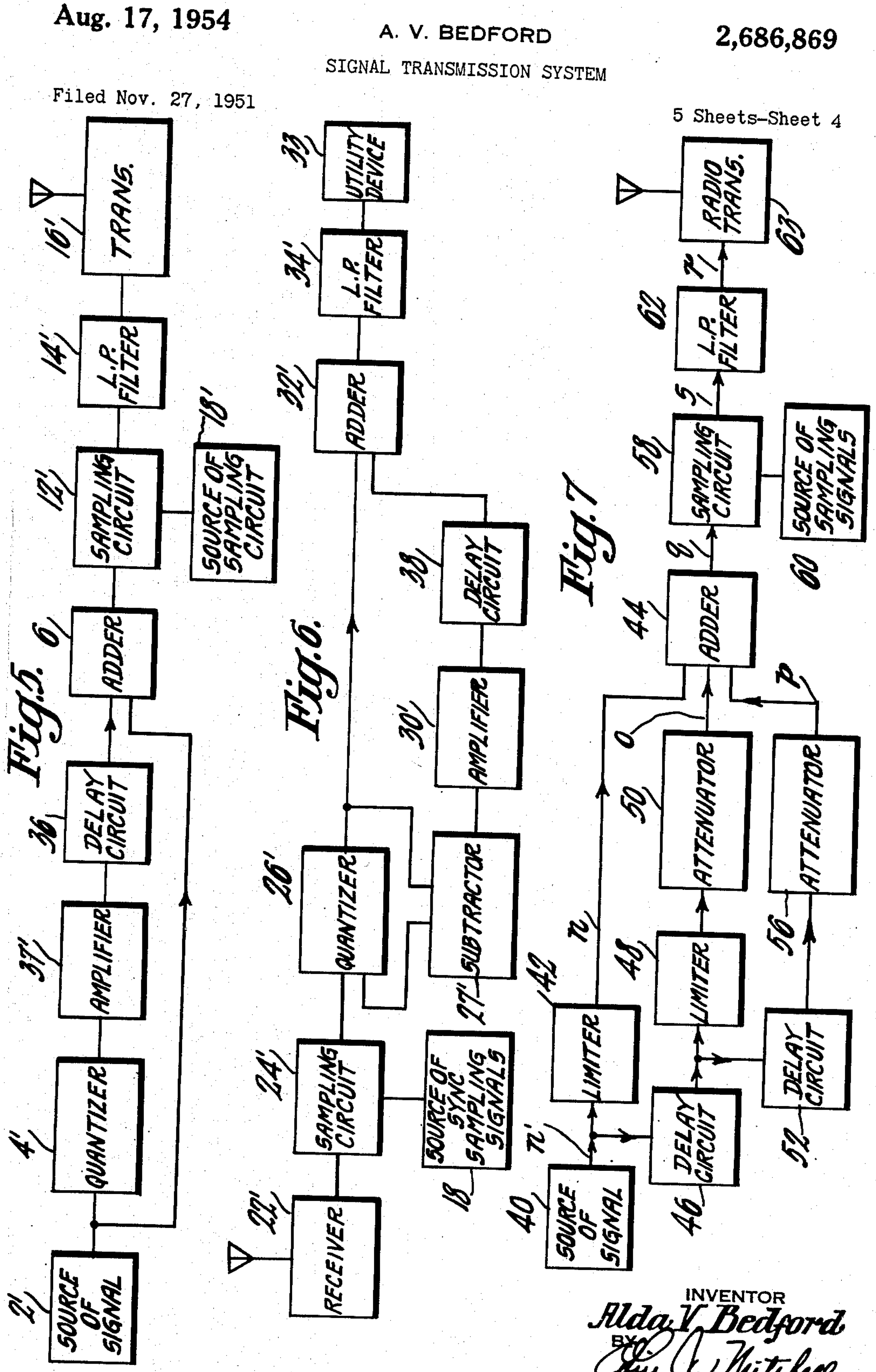
Figure 5 illustrates an alternative arrangement for the transmitter of Figure 1.
Figure 6 illustrates by block diagram a transmitter having a bi-valued signal in one third the band width normally required. In television this type signal would transmit a black and white picture with no half tones.
Figure 7 illustrates by block diagram a transmitter adapted to transmit a signal in one third the bandwidth normally required.

Figure 5 illustrates an alternative form of transmitter for generating signals of the general type generated by the transmitter of Figure 1. For convenience, similar component parts are indicated by primed numerals. Instead of attenuating the non-quantized signal, as was done in the transmitter of Figure 1, the quantized signals are amplified by an amplifier 37 to such a degree that the original signal *a* lies within quanta levels. Thus, the attenuator 10 of Figure 1 and the amplifier 37 of Figure 5 are both means for insuring that the unquantized signals will fit in between quanta levels.

Instead of delaying the non-quantized signals, as was done in the transmitter of Figure 1, the quantized signals are delayed by delay means 36. It is only important that means be provided for delaying either the quantized or the non-quantized signals with respect to the other. In the arrangement of Figure 1 the samples provided by the sampler 12 represent the value of the quantized signal at a given instant and of the value of the non-quantized signal at a previous instant. In the arrangement of Figure 5, the samples appearing at the output of the sampler 12' represent the value of the non-quantized signal at a given instant and the value of the quantized signal occurring at a previous instant.

The receiver of Figure 6 is adapted to cooperate with the transmitter of Figure 5. Because of its similarity to the receiver of Figure 2 corresponding components are designated by primed numerals. The non-quantized signal is extracted by the subtractor 27' and its original relative amplitude is restored by an amplifier 35. In order to secure proper phase relationship between the quantized and non-quantized signals, a delay means 38 is placed in series with the amplifier 30'. In this way the total delay in the whole system for the quantized and non-quantized signals is the same.

Figure 8:
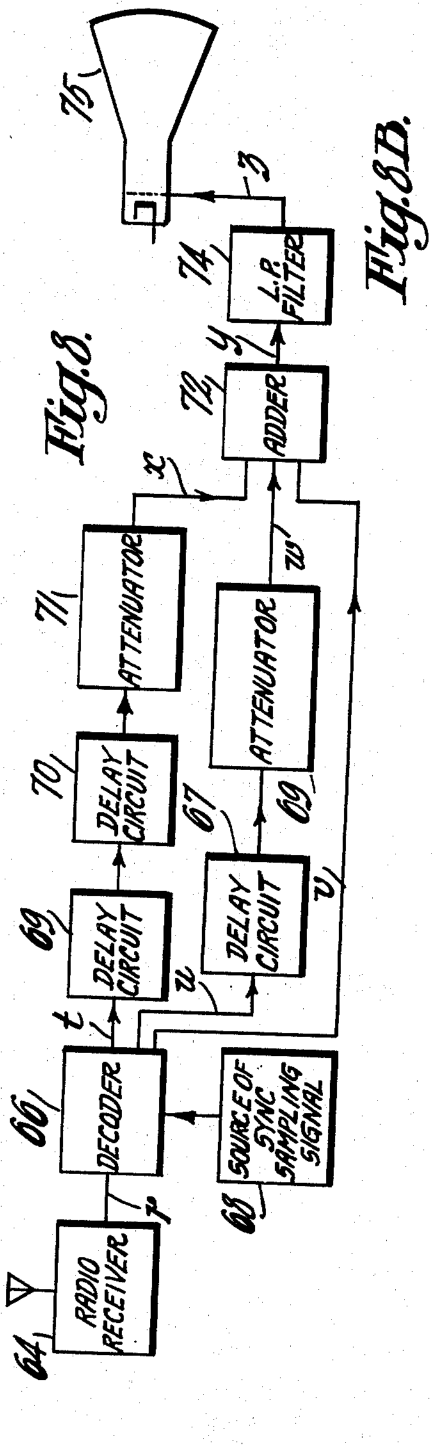
Figure 8 illustrates a receiver adapted to decode the signals sent by the transmitter of Figure 6.
Figure 9:
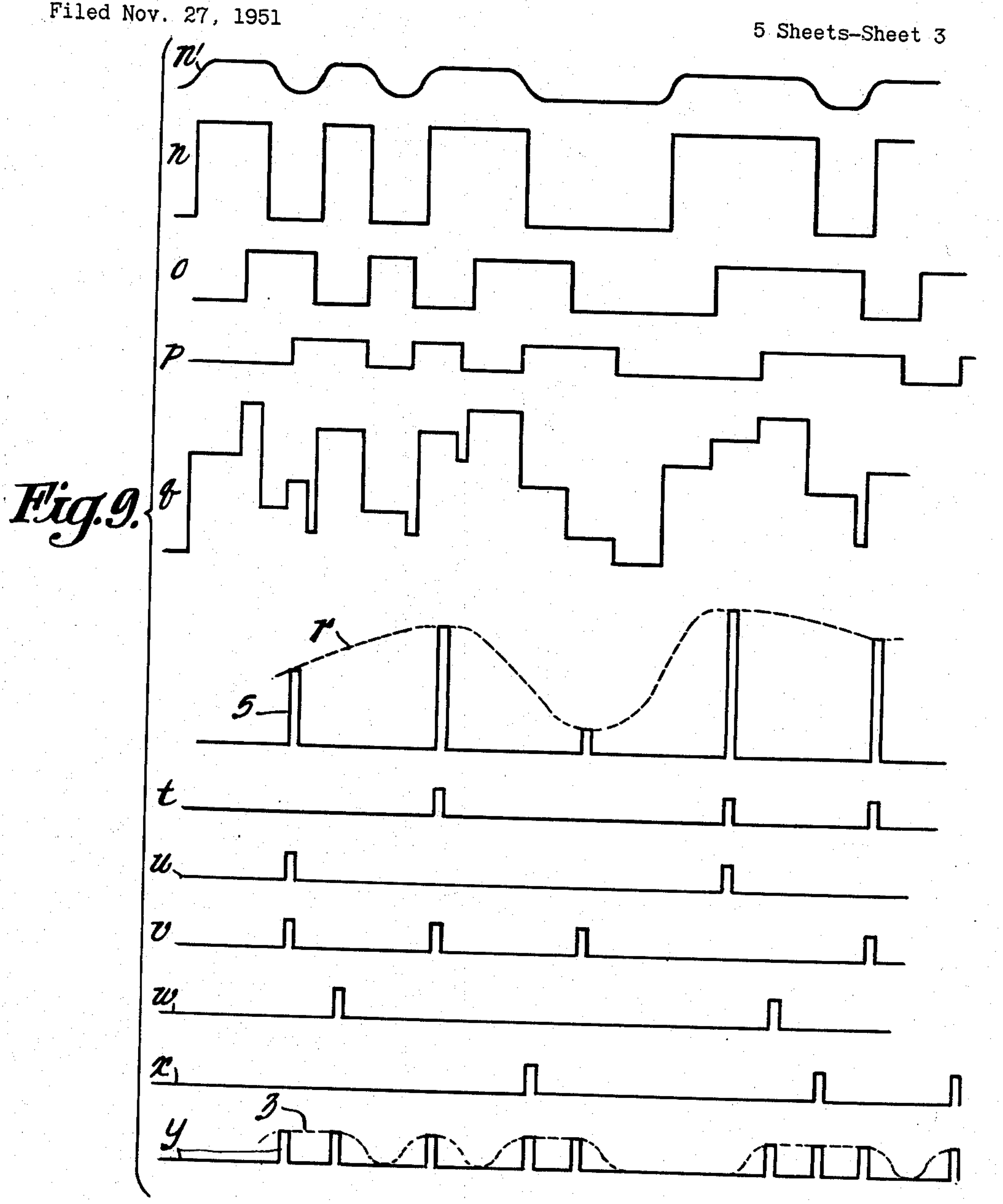
Figure 9 illustrates the type of waves that appear at different points in the transmitter of Figure 7 and the receiver of Figure 8.

Figures 7 and 8 respectively illustrate a transmitter and receiver adapted to convey and reproduce a signal having two significant levels in a band width that is one-third the normal amount required. Figure 9 shows waves $n'$ through $y$ that appear at similarly designated points in Figures 7 and 8. A signal such as that indicated by the letter $n'$ is supplied by a source 40. After passing through a limiter 42, that may be an amplifier biased beyond cut off or a biased diode, the signal $n'$ assumes one of two levels as indicated by the waveform $n$. The signal $n$ is applied to an adder 44 directly.

The signal $n'$ is also applied to a series circuit comprising a delay network 46, a limiter 48, and an attenuator 50, and the resulting wave $o$ is applied to the adder 44. The limiter 48 limits the signals to the same maximum value as the limiter 42, and the attenuator 50 reduces the signals by a factor of two. The output of the delay network 46 is also applied to a series circuit comprising another delay network 52 and an attenuator 56, the attenuator serving to reduce the signals applied to it by a factor of four so as to produce a wave $p$. Thus the maximum values of the waves $n$, $o$ and $p$ are in the ratio of 4:2:1. If wave $n'$ to be transmitted had steep rises and falls in addition to flat tops and bottoms, the limiters 42 and 48 would be unnecessary.

The signals $n$, $o$ and $p$ are added in the adder 44 and the resulting signal $q$ is sampled in a sampler 58 under the control of sampling signals supplied by a source 60 so as to form samples $s$. After being smoothed in a low pass filter 62 and amplified, the samples $s$ appear as wave $r$ which is transmitted to a remote point by any desired means 63. The upper limit of the low pass filter 62 is one-third the highest effective or useful frequency of signal $n'$ that is to be conveyed to the remote point. The highest useful frequency is determined only by the intervals between the rises and falls of the wave. It is understood that unnecessarily steep rises and falls in wave $n'$ involve higher frequency harmonics. The sampler 58 operates at a frequency equal to twice the upper frequency limit of the low pass filter 62 or in this particular application at two-thirds the highest useful frequency of the signal $n'$. The amount of delay in each of the delay networks 46 and 52 is equal to one-third of the time interval between the sampling pulses $s$ provided by the sampler 58. Thus, when the wave $q$ is sampled in the sampler 58, each sample $s$ bears information with respect to what the wave $n'$ is at a particular time plus information as to what it was in two preceding equally spaced instants of time.

In the receiver of Figure 8 the wave $r$ is recovered by any suitable detecting means 64 and applied to a decoder 66, the details of which will be discussed in connection with Figures 8A and 8B. The decoder 66 may also sample the wave $r$ at instants corresponding to the pulses $s$. It is apparent that the sampling must be at the same frequency and phase as the sampling in the sampler 58 at the transmitter and therefore any known means may be employed for synchronizing the sampling signals provided by the source 68 at the receiver with the sampling signals at the transmitter.

At the instant when the received signal $r$ is sampled in the decoding tube, it has a value determined by the instantaneous value of the signal $n'$, the value the signal $n'$ had in a previous interval reduced by a factor of 2 and illustrated by wave $o$ and the value the signal $n'$ had in the next previous interval reduced by a factor of 4 as illustrated by wave $p$. Since the wave $n$ may either be 0 or 4, the wave $o$, 0 or 2, and the wave $p$, 0 or 1, these waves can be added in all possible combinations without adding up to the same composite value for any two different combinations of individual values. Therefore, the amplitude of the signal $r$ at sampling intervals uniquely represents a particular combination of the possible value of the waves $n$, $o$ and $p$. For example, if wave $r$ has a value of one unit only wave $p$ could have a maximum amplitude as the others would be too large. Again, if the signal $r$ had a value of 5 units, the value could only be attained by adding the maximum values of waves $n$ and $p$. The decoder 66 produces, in a manner to be described, a pulse $t$ at one output whenever the received wave $r$ has a value during a sampling interval of at least 4 units so as to indicate that the wave $n$ had a maximum value at that time. The decoder 66 also produces pulses $u$ and $v$ at two other outputs whenever the amplitude of the received wave $r$ during a sampling interval is such as to indicate that waves $o$ and $p$ respectively had maximum values. The pulses $t$, $u$, and $v$ are preferably of the same amplitude and when present at all occur at the same time.

The pulses $v$ indicating the presence of the maximum value of the wave $p'$ are passed directly to an adder 72. The pulses $u$ that indicate the existence of the maximum of the wave $o$ are delayed by one-third the time between the pulses $s$ by a delay unit 67 and after passing through an attenuator 69 that reduces their amplitude by one-half appear as indicated in wave $w$ at the adder 72. Similarly, the pulses $t$, indicating the presence of the maximum value of the wave $n$ are delayed by two-thirds the time interval between successive pulses $s$ by delay units 69 and 70 and after passing through an attenuator 71 that reduces their amplitude by a factor of 4 appear at the adder 72 as indicated in the wave $x$. As in all the figures, the presence of attenuating merely indicates the relative gains in the respective circuits, and, as is well known to those skilled in the art, such relative gain could also be achieved by amplifiers. It should be noted, however, that the gains for any one of the signal components such as $n$, $o$ or $p$ is the same if both the transmitter and receiver are considered.

The wave forms $v$, $w$ and $x$ are added in the adder 72 so as to provide a series of pulses $y$ which when integrated in the low pass filter 74 produce a wave $z$ which corresponds to the original signal $n'$ with the exception that it is delayed by two-thirds the time interval between the pulses in addition to the delay caused by transmission. The wave $z$ is applied to any means 75 for making use of the wave $z$.

As in the case with the transmitter and receiver of Figures 1 and 2 the band width saving is accomplished by successively delaying the signal to be transmitted, adding these delayed signals to the original and sampling the sum thus derived to produce the pulses $s$.

Figure 8B:
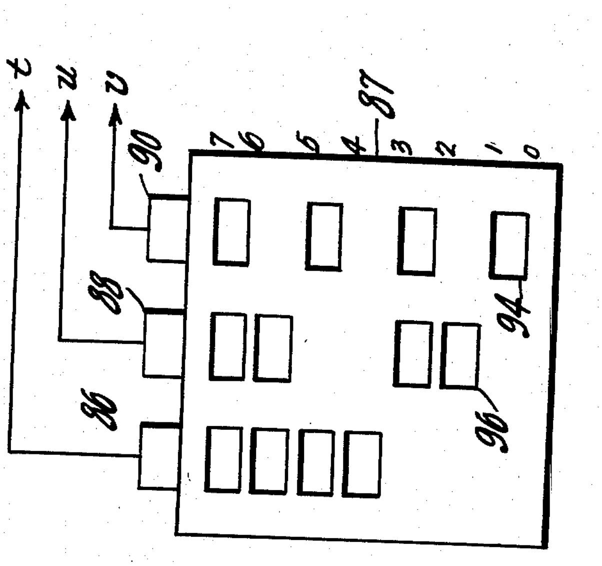
Figures 8A and 8B illustrate a type of decoding cathode ray tube that may be employed in the receiver of Figure 8.
Figure 8A:
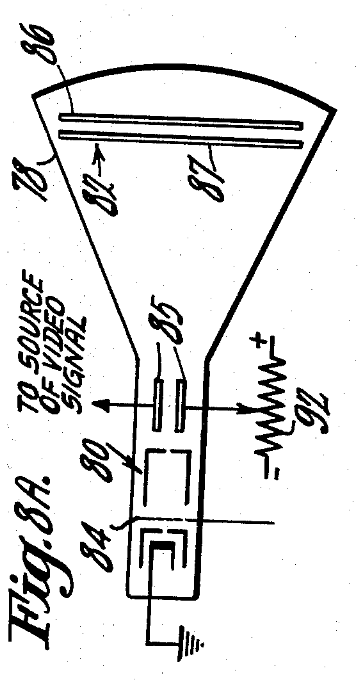

We turn now to the discussion of Figures 8A and 8B which illustrate one form that the decoder 66 of Figure 8 may assume. A cathode ray tube 78 is equipped with an electron gun 80 adapted to project a thin horizontal ribbon beam of electrons toward a target generally indicated by the numeral 82. The sampling signals provided by the source 68 are applied to a grid 84 so as to pulse this beam of electrons. The signal $r$ is detected by the means 64 and applied to one of a set of vertical deflection plates 85 so as to cause the beam to assume a vertical position on the target 82 that corresponds with the amplitude of the received signal $r$.

In Figure 8B the details of the target 82 are illustrated. It is comprised of a mask 87 of beam obstructing material having three vertical rows of apertures cut therein. Behind each of the vertical rows of apertures are separate target strips 86, 88 and 90 respectively that are adapted to produce a signal when struck by a beam of electrons. As will be seen from the following discussion, the target strip 86 produces pulses $t$, the target strip 88 produces pulses $u$ and the target strip 90 produces the pulses $v$. The biasing potential applied to the deflection plates 85 by the potentiometer 92 is so adjusted that with no signal on the deflection plates, the beam assumes a rest position opposite the numeral 0 of Figure 8B. If for example, the wave $r$ is less than one unit in amplitude, the beam of electrons is deflected so to strike the target 90 through an aperture 94. Due to the fact that the beam is pulsed by the sampling pulses applied to the grid 84, a pulse $u$ is produced by the target 90. Now let us assume that the amplitude of the received wave $r$ lies between one and two units, thus indicating that the wave $o$ must be present at the adder 44 of the transmitter. The ribbon beam of electrons in the decoder of the receiver is deflected further in a vertical direction so that it strikes the target 88 through an aperture 96 so as to produce pulses $u$. Further examination of the target shows that any of unique combinations of amplitudes of the wave forms $n$, $o$ and $p$ can be decoded.

In any of the arrangements shown, the size of a unit has to be established at transmitter and receiver. It is only necessary to transmit periodically a signal of known relative amplitude that can be identified. As this is always done in television, there is no need to describe it in detail.

Except where necessary for purposes of the invention, amplifiers have been omitted in the interest of simplicity. One skilled in the art would not have any difficulty in introducing amplifiers at the proper points.

Having thus described the invention, what is claimed is:

1. A transmitter for transmitting a given signal within a bandwidth less than the highest effective frequency in said signal comprising in combination, an output terminal and an input terminal, a quantizer connected so as to form a first path between said input terminal and said output terminal, a second path coupled to conduct electrical energy from said input terminal to said output terminal, means in one of said paths for delaying the signals passing therethrough, means for adjusting the relative gains of said two paths so that the maximum amplitude of the signals flowing in said second path does not exceed any one quanta level of said quantizer, and sampling means connected between said input and output terminals to permit electrical energy to flow between said input and output terminals during successive intervals.

2. A transmitter as described in claim 1 wherein the delaying means is of a character that delays the signals by an amount equal to the time between the successive intervals during which energy flows from said input to said output terminal.

3. A receiver comprising in combination an input terminal, a quantizer having an input and output forming part of a first electrical energy path coupled to said input terminal, a subtractor forming part of a second electrical energy path coupled between the input and output of said quantizer, an output terminal coupled to the output of said quantizer and said subtractor, means for causing energy to flow periodically between said input and output terminals, means in one of said paths for delaying the signals passing therethrough, and means for establishing the relative gains of the first and second paths.

4. A transmitter comprising in combination means for sampling a signal at regular intervals with respect to the signal so that a given number of samples form a group, means for changing the relative maximum amplitudes of each of said samples in such a manner that any two combinations of any of the maximum levels add up to different values, each maximum level appearing not more than once in any of said combinations, means superimposing samples of each group onto one another to form a composite sample for each group, and a low pass filter to which said composite samples are applied, said low pass filter having an upper frequency limit equal to at least half the frequency of said composite samples.

5. A receiver comprising in combination, means for quantizing a received signal so as to form a first wave, means for extracting the difference between said quantized signal and said received signal so as to form a second wave, means for delaying one of said waves with respect to the other, means for amplifying one of said waves with respect to the other, and means for providing samples of said first wave during a first set of intervals and means for providing samples of said second wave during a second set of intervals, each of said second set of intervals occurring between a different pair of said first set of intervals.

6. A transmitter comprising in combination a plurality of electrical paths from one point to another, means for establishing different amounts of delay in the respective paths, means for causing said paths to have different amounts of gain so that the relative values of gain will be such that when the smallest gain is arbitrarily assigned a value of unity and the other gains are assigned numbers related to unity in proportion to their increased gains, any two combinations of said numbers add up to a different sum, an adder coupled to the output of each of said paths, a low pass filter coupled to the output of said adder, and means for causing signal energy to flow through said paths to said adder during spaced intervals so that composite pulses are applied to said low pass filter.

7. A receiver comprising in combination, means for quantizing a received signal so as to form a first wave means for extracting the difference between said first wave and said received signal so as to form a second wave, means for delaying one of said waves with respect to the other, means for amplifying one of said waves with respect to the other, and means for providing samples of said first wave during a first set of intervals and means for providing samples of said second wave during a second set of intervals, each of said second set of intervals occurring between a different pair of said first set of intervals.

References Cited in the file of this patent

UNITED STATES PATENTS

| Number | Name | Date |
|---|---|---|
| 2,437,707 | Pierce | Mar. 16, 1948 |
| 2,467,486 | Krumhansl | Apr. 19, 1949 |
| 2,521,733 | Lesti | Sept. 12, 1950 |
| 2,592,228 | Adams | Apr. 8, 1952 |
| 2,605,361 | Cutler | July 29, 1952 |